United States Patent [19]
Pohjakallio

[11] Patent Number: 5,502,725
[45] Date of Patent: Mar. 26, 1996

[54] METHOD AND SYSTEM FOR SENDING SHORTER SERVICE NUMBER IN PLACE OF ALL BUT FIRST PACKET, IN PLACE OF LONGER DESTINATION ADDRESS, FOR INCREASING USER DATA CONTENT OF PACKET DATA TRANSFER

[75] Inventor: Pekka Pohjakallio, Espoo, Finland

[73] Assignee: Nokia Telecommunications Oy, Espoo, Finland

[21] Appl. No.: 211,738

[22] Filed: Apr. 14, 1994

[30] Foreign Application Priority Data

Aug. 14, 1992 [FI] Finland .................................. 923668

[51] Int. Cl.⁶ .............................. H04J 3/26; H04L 12/56
[52] U.S. Cl. ........................ 370/94.1; 370/95.3; 379/63
[58] Field of Search ................................... 370/95.1, 94.1, 370/85.13, 85.14, 95.3; 455/54.1, 54.2, 33.1; 379/59, 63

[56] References Cited

U.S. PATENT DOCUMENTS

| | | | |
|---|---|---|---|
| 4,706,081 | 11/1987 | Hart et al. | 370/61 |
| 4,887,265 | 12/1989 | Felix | 370/94.1 |
| 4,897,841 | 1/1990 | Gang, Jr. | 370/85.15 |
| 5,095,480 | 3/1992 | Fenner | 370/94.1 |
| 5,239,577 | 8/1993 | Bates et al. | 379/201 |

FOREIGN PATENT DOCUMENTS

| | | |
|---|---|---|
| 2282198 | 9/1988 | European Pat. Off. . |
| 2332818 | 9/1989 | European Pat. Off. . |
| 0332825 | 9/1989 | European Pat. Off. ......... H04Q 7/04 |
| 0333679 | 9/1989 | European Pat. Off. ......... H04B 7/26 |
| 2522636 | 1/1993 | European Pat. Off. . |

Primary Examiner—Douglas W. Olms
Assistant Examiner—Min Jung
Attorney, Agent, or Firm—Cushman Darby & Cushman

[57] ABSTRACT

A transmitting party sends a transfer request to a transfer network. Upon receiving the request, the transfer network allocates a service number (SN) to the transmitting party, if allowed by the current traffic load. The service number identifies the transmitting party for a predetermined period. Upon sending the service number to the communicating party which originated the transfer request, the transfer network preferably starts a timer which monitors the validity period of the service number. The transmitting party sends the destination address (DN) over the transfer network only once during the validity period of the service number. The transfer network associates the destination address (DN) to the service number allocated to the transmitting party. The transmitting party utilizes only the service number (SN) as an identity in the data packets transferred during the actual data transfer, and the transfer network routes the packet to the destination address associated with the service number.

10 Claims, 5 Drawing Sheets

FIG. 2

BCCH + CCCH
BTS → MS

| F | S | B | | C | F | S | C | | C | F | S | C | | C | F | S | C | | C | F | S | C | | C |

BCCH + CCCH (RACH)
MS → BTS

| R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R |

←——————— 51 frames   235 ms ———————→

BCCH + CCCH + 4 SDCCH/4
BTS → MS

| F | S | B | | C | F | S | C | | C | F | S | D0 | D1 | F | S | D2 | D3 | F | S | A0 | A1 |
| F | S | B | | C | F | S | C | | C | F | S | D0 | D1 | F | S | D2 | D3 | F | S | A2 | A3 |

BCCH + CCCH + 4 SDCCH/4
MS → BTS

| D3 | R | R | A2 | A3 | R | R | R | R | R | R | R | R | R | R | R | R | R | R | R | R | R | D0 | D1 | R | R | D2 |
| D3 | R | R | A0 | A1 | R | R | R | R | R | R | R | R | R | R | R | R | R | R | R | R | R | D0 | D1 | R | R | D2 |

S = SCH
F = FCCH
B = BCCH
C = CCCH
R = RACH
D = SDCCH
A = SACCH/C

METHOD AND SYSTEM FOR SENDING SHORTER SERVICE NUMBER IN PLACE OF ALL BUT FIRST PACKET, IN PLACE OF LONGER DESTINATION ADDRESS, FOR INCREASING USER DATA CONTENT OF PACKET DATA TRANSFER

FIELD OF THE INVENTION

The invention relates to a method for the transfer of packet data from a transmitting party over a transfer network to a receiving party on the basis of the destination address.

BACKGROUND OF THE INVENTION

In the transfer of packet data, the data packet usually contains not only the user data to be transferred but also overhead data, such as the identification (address) of the receiving party, on the basis of which the transfer network is able to route the data packet to its destination. However, standard addresses used in data communication systems (telephone numbers, subscriber identities, equipment identities, etc.) are relatively long so that they require packet transfer capacity which otherwise could be utilized for the transfer of user data. This problem is further aggravated when very short data packets have to be used, e.g., due to the characteristics of the transmission channel. In such very short data packets, standard addresses would use almost all of the packet transfer capacity. In the worst case, the transfer capacity of the data packet is not sufficient to accommodate the address. However, as mentioned above, each data packet in a normal packet data transfer should contain address data in order that the system can identify and route the packets, especially in cases where there are several subscribers transmitting packet data simultaneously on the same channel.

DISCLOSURE OF THE INVENTION

The object of the invention is to provide a packet data transfer method which alleviates the above outlined problem and utilizes the available transfer capacity more efficiently than the prior art methods.

One concept of the invention is a method for the transfer of packet data from a transmitting party over a transfer network to a receiving party. The method according to the invention is characterized in that the transmitting party sends the destination address data to the transfer network only once for each transfer transaction. The transfer network allocates the transmitting party a service number at the beginning of the transfer transaction so as to identify the transmitting party and the destination address, the service number being shorter than the destination address. The transmitting party utilizes the allocated service number in place of the destination address in the data packets sent during the transfer transaction. The transfer network identifies the data packets sent by the transmitting party on the basis of the service number and forwards the data packets on the basis of the destination address associated with said service number.

Another concept of the invention is a mobile station for a cellular radio system comprising at least one base station communicating with mobile stations residing in the cell, the mobile station comprising means for sending user data in packet format to the base station. The mobile station according to the invention is characterized in that the first data packet(s) sent by the mobile station to the base station at the beginning of each transfer transaction contain(s) the entire destination address of the receiving party while subsequent data packets sent during the same transfer transaction contain a service number in place of the entire destination address, the service number identifying the transmitting party and being shorter than the destination address.

In the invention, the transmitting party sends a transfer request over the transfer network. Upon receiving the transfer request, the transfer network allocates a service number to the transmitting party, if allowed by the traffic load. The service number identifies the transmitting party for a predetermined period of time, referred to as a validity period. On transmitting the service number to the transmitting party, the transfer network preferably starts a timer which monitors the validity period of the service number. The transmitting party sends the address of the receiving party, referred to as a destination address, over the transfer network only once during the validity period of the service number. The transfer network associates the destination address with the service number allocated to the transmitting party. During subsequent communication, the transmitting party uses merely the service number as "a destination address" in the transmitted data packets, and the transfer network routes the data packets to the receiving party on the basis of the service number included in each data packet. The service number is essentially shorter and requires less transfer capacity of the packet than the standard address. Consequently, most of the transfer capacity of the data packet can be used for the transfer of user data. The transfer capacity of the system can thus be utilized more efficiently than in prior art systems in which the destination address is transferred in each data packet.

As the transfer network allocates the service number to the transmitting party only for a predetermined period of time, the network is able to control the traffic load in the system and the distribution of the transfer capacity between different subscribers.

A particularly advantageous application of the present invention is a packet data transfer on a random access control channel of a cellular radio system.

BRIEF DESCRIPTION OF THE DRAWINGS

The invention will now be described by means of illustrating embodiments with reference to the attached drawings, in which

FIG. 2 illustrates TDMA channel organization in different 51-superframe configurations in the GSM system;

DETAILED PREFERRED EMBODIMENTS OF THE INVENTION

The method according to the present invention is suitable for use in any packet data transfer system to improve the utilization of the transfer capacity. It is especially efficient when applied in systems where short data packets have to be used for some reason.

A preferred application of the method according to the invention is packet data transfer on control channels in analog and in digital cellular radio systems. The method is particularly advantageous when applied in the Pan-European digital TDMA (Time Division Multiple Access) mobile radio system GSM and other similar digital systems, such as DCS1800 and PCN (Personal Communication Network). In the following, the preferred embodiment of the invention will be described as an application in the GSM system, to which the invention, however, is not limited.

Figure 1:
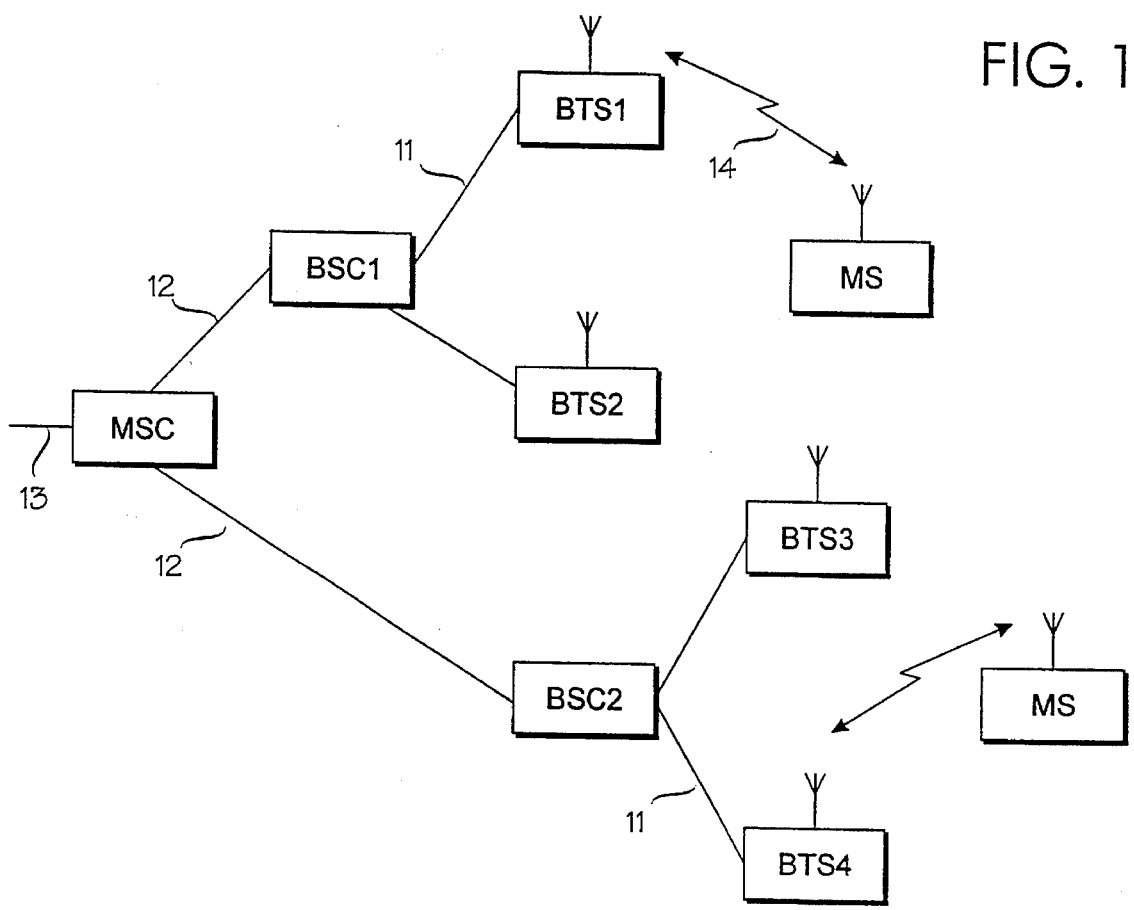
FIG. 1 illustrates a part of a cellular radio system in which the method according to the invention is applied.

FIG. 1 shows schematically a portion of a GSM cellular radio system. In the cellular radio system, the area covered by the system is divided into radio cells. Two base station controllers BSC1 and BSC2 are connected by digital transmission links 12 to a mobile exchange MSC. Furthermore, base stations BTS1, BTS2 and BTS3, BTS4 are connected by digital transmission links 11 to the base station controllers BSC1 and BSC2, respectively. Each BSC and the base stations controlled by it form a base station system BSS. The radio coverage area of a single base station BTS typically forms a single radio cell. Each base station BTS1 to BTS4 has a predetermined fixed number of physical radio channels. The configuration and properties of the GSM system are described in greater detail in the GSM specifications, which are hereby incorporated by reference. Only a few features of those specifications, in particular ones an understanding of which is essential to the invention will be described below.

In the TDMA (Time Division Multiple Access) systems, a signal (physical channel) consists of TDMA frames each comprising a number of time slots (eight time slots in GSM) in which logical channels are transferred. Logical channels comprise traffic channels for calls to be set up with mobile radio stations MS residing in the cell, and control channels for signalling with mobile radio stations MS residing in the cell. In the GSM system, one superframe comprises 51 or 26 TDMA frames. FIG. 2 illustrates different kinds of control channel superframes used over the radio path in the transmission direction (downlink) from the base station BTS to the mobile radio station MS (such as a mobile telephone) and in the reverse direction (uplink) from the mobile radio station MS to the base station BTS.

Logical channels essential for the invention include Common Control Channels CCCH. In the paging, the fixed network pages a mobile station MS in order to alarm the MS to contact the network. To this end, the MSC commands the base station system BSS to send a page on a Paging channel PCH, which is one of the CCCH channels. When the mobile station MS receives a page or wants to initiate a call, it sends a connection request on a Random Access Channel RACH, which is also one of the CCCH channels. In response to the connection request the base station system BSS sends a channel assignment on an Access Grant Channel AGCH.

Figure 3:
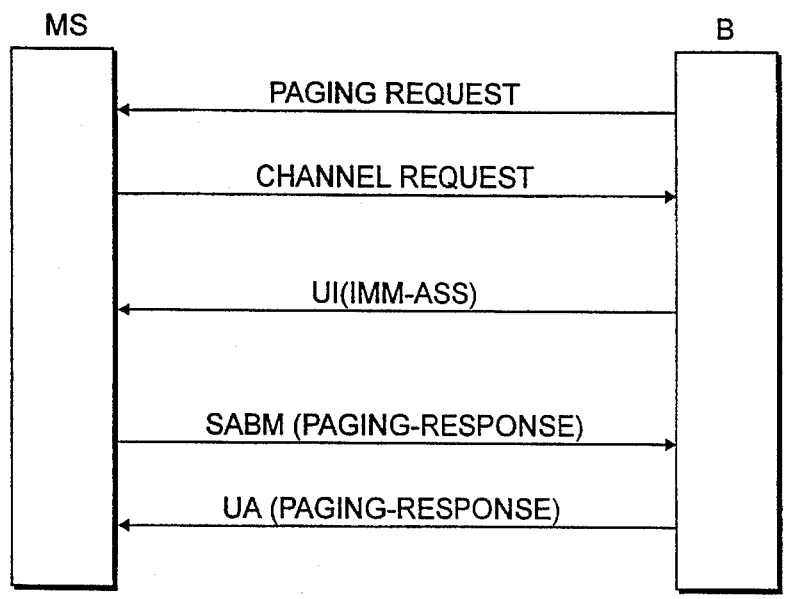
FIG. 3 is a signalling diagram illustrating a standard call set-up procedure in the GSM system.

FIG. 3 illustrates messages transferred over the radio path when the base station system BSS pages a mobile subscriber station MS. The BSS pages the mobile station MS by sending a Paging Request message on the PCH. Upon receiving the paging request, the mobile station MS requests a signalling channel by sending a Channel Request message on the RACH. Upon receiving the Channel Request message, the base station system BSS, which is not aware that the current connection request is associated with the previously transmitted Paging Request message, allocates a signalling channel (SDCCH) for the mobile station MS by sending an Immediate Assignment message on the AGCH. When the SDCCH is allocated to the mobile station MS, the mobile station transmits on this channel a Paging Response message, which is forwarded to a VLR controlling the paging procedure. On the basis of this message the VLR establishes a radio connection and then transfers the call control to the MSC.

From the Channel Request message onward, the connection set-up initiated by the mobile station MS is such as shown, the only difference being that the MS sends a page without the impulse given by the Paging Request message. The BSS is not able to distinguish between Channel Request messages sent for different reasons but always responds to them in the same way.

In the present invention, the broadcast nature of the above-described paging messages and the random access nature of the channel request messages are utilized by implementing a packet transfer solution in parallel therewith. The packet transfer according to the present invention does not require any call setup and is compatible with the original service so that the mobile stations already existing in the cellular system will not be aware of this new facility. In other words, the invention embodies a substantially atomatic user data transfer concept in which addressed data can be transferred in a single packet (TDMA time slot) without any related connection establishment.

The mobile radio station MS transmits data in packet format on the RACH in Packet Data Channel Request messages. The base station system BSS acknowledges the successful receipt of the Packet Data Channel Request message by sending a Packet Data Paging Request message on the PCH.

Due to the fact that the timing of the random access burst, in which form both the Packet Data Channel Request and the Channel Request message are sent, is not known, only one octet of information can be transferred in the burst. This is not sufficient for data applications, and it is therefore necessary that a normal burst can be used for the packet data transfer. The transmission of such a normal burst is timed so that when the burst is received in the base station system BSS, it is synchronized with a TDMA frame. This requires that the base station system BSS be controlled similarly as in the standard connection establishment.

In the standard connection establishment, the base station detects the time of reception of the random access burst Channel Request. On the basis of the time of reception, the base station determines a timing advance value which is sent to the mobile station in the Immediate Assignment message so that any subsequent signalling on the SDCCH will take place with a proper timing allowing the use of a normal burst.

This feature of the base station of the TDMA-based digital cellular network is utilized in the invention as will be described below with reference to FIG. 5. The mobile station MS which wants to transmit packet data sends a Packet Data Channel Request message, which indicates the packet transfer requested. The Channel Request message may be a conventional random access burst, in which e.g. an ESTABL.CAUSE field is used to distinguish a burst requesting a packet transfer from a random access burst requesting a standard connection establishment. The ESTABL.CAUSE field may be, e.g, such as shown in FIG. 6, where the first three bits are "001" and the remaining bits consist of a standard random number included in the burst.

Figure 4:
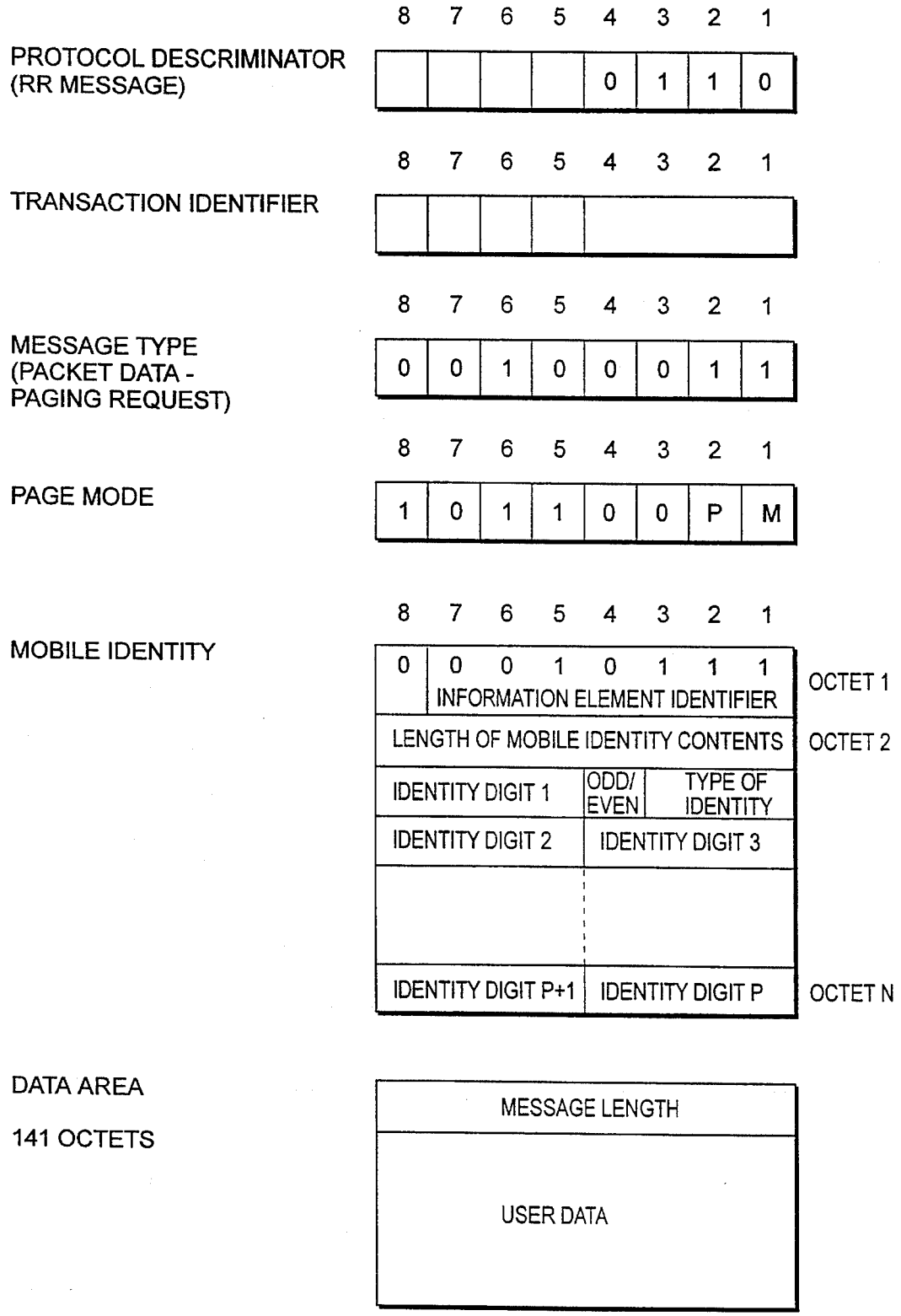
FIG. 4 illustrates a GSM Paging Request message modified for the packet data transfer according to the invention.
Figure 7:
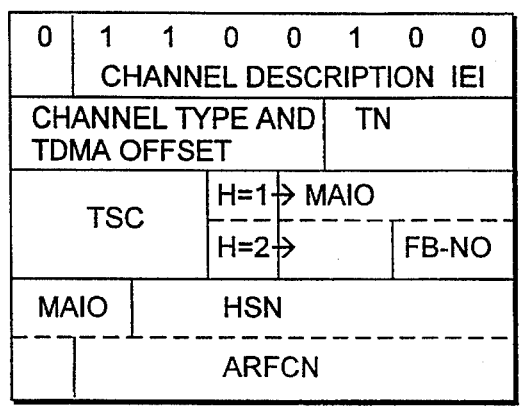
FIG. 7 illustrates a Channel Description information element in a GSM Immediate Assignment message modified for use as a packet acknowledgment message according to the invention.

When the fixed network (BSS) receives a packet data transfer request from the mobile station MS, it will not assign a dedicated SDCCH to the mobile station MS like in a standard case shown in FIG. 3. Instead, the base station system BSS detects the timing of the Packet Data Channel Request burst received on the RACH, determines the correct timing on the basis thereof, and grants access for the packet transfer by sending the Packet Data Immediate Assignment message on the AGCH if allowed by the traffic load of the control channel or the system. The Packet Data Immediate Assignment message, in which the base station system BSS sends a grant for a packet data transfer to the mobile station MS, may be, e.g., an Immediate Assignment message, the message type field of which (cf. FIG. 4) is set to a value "00111101" to indicate the transfer of packet data. Because the message does not command the mobile station MS to the SDCCH as normal, but the data transfer takes place on the RACH, the channel type field of the channel information element shown in FIG. 7 is set, e.g., to a value "10001" to indicate that the MS should subsequently stay on the RACH. In addition, the message contains at least timing advance information which will be utilized by the mobile station MS in the subsequent transmission transactions on the RACH for synchronization with the operation of the base station. Due to the correct timing advance, the mobile station will subsequently be able to use a normal burst for the packet transfer on the RACH. The normal burst is longer than the random access burst and it has more capacity for user data. Such normal bursts are called Packet Data messages. Their structure will be described below in connection with FIGS. 8A to 8D. The Packet Data Immediate Assignment message may also contain a limited authorization to load the system by packet transfer. The limited authorization (transmission grant) may be, e.g., for a predetermined period of time and/or it may limit the number of packets to be transferred in a time unit.

As several mobile stations MS may transmit data simultaneously on the RACH, the fixed network should be able to distinguish between the data packets of deliveries from different mobile stations MS. The address of the receiving party (the destination address) should therefore appear from the packet to be transferred. However, the standard addresses used in the cellular radio system and other telecommunication systems are very long, so that it is uneconomical to transfer the address of the receiving party in each message if the transfer capacity of the system is to be utilized optimally for the transfer of user data. In the GSM system, a normal burst to be transferred on the RACH may be even too short for the transfer of address information in a single burst in addition to user data.

According to the invention, the fixed network allocates the MS a service number SN which identifies the transmitting MS. At the same time, the fixed network starts a timer 1 which is used to assign a specific service number to a specific MS for a predetermined period of time (a validity period). After the expiry of the time set for the timer, the fixed network can allocate the same service number SN to another mobile station MS.

The Packet Data Immediate Assignment message, in which the base station BTS sends the mobile station MS a packet data transfer grant, also contains a new information element in which the service number is transferred to the mobile station MS. This information element may contain, e.g., 8 bits of which four bits indicate the service number and three bits indicate the frame number. The service number is a 4-bit field and may give 16 different service numbers. The service number 0000 is interpreted as a negative response. In other words, if all service numbers are reserved, and the MS cannot be allocated a service number SN, the service number field is set to a state 0000.

Figure 5:
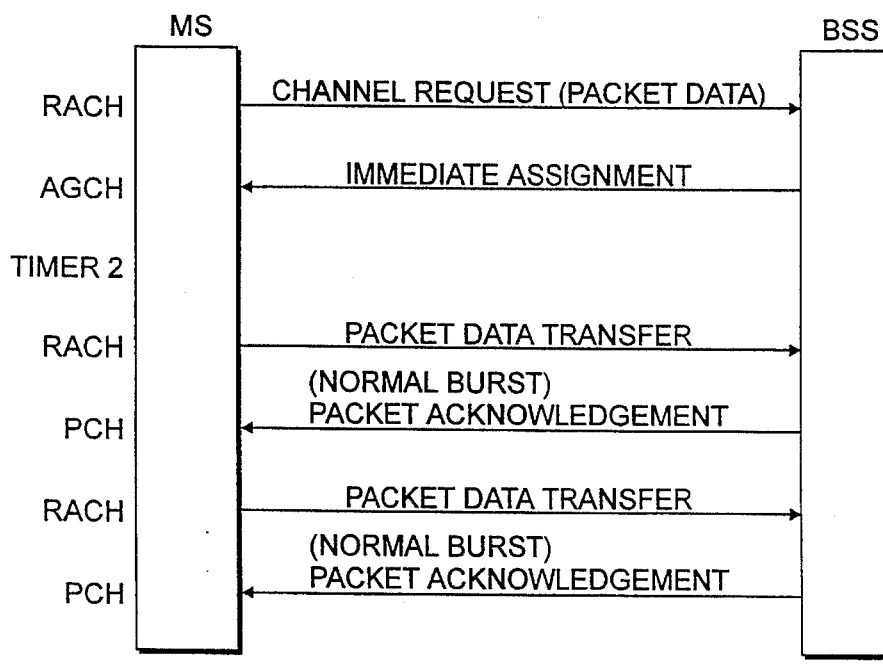
FIG. 5 is a signalling diagram illustrating packet data transfer according to the invention from a subscriber equipment MS to a base station BTS.
Figure 6:
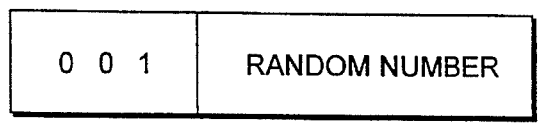
FIG. 6 illustrates a GSM Channel Request message modified into a message requesting the transfer of packet data.

Further referring to FIG. 5, when the MS receives from the AGCH a Packet Data Immediate Assignment message, the MS starts a timer 2 so as to follow the lapse of the validity period of the service number SN assigned to it. The time may be set to, e.g., 10 seconds. If the MS still wants to send packet data after the expiry of the timer 2, it has to request a new service number SN from the fixed network in a manner described above. The MS transfers packet data on the RACH in so-called standard Packet Data messages, shown in FIGS. 8A to 8D, in place of the random access bursts.

As mentioned above, the destination address of the data transfer should also be transmitted over the radio path. Two alternative ways of solving this problem will be described below.

Figure 8A:
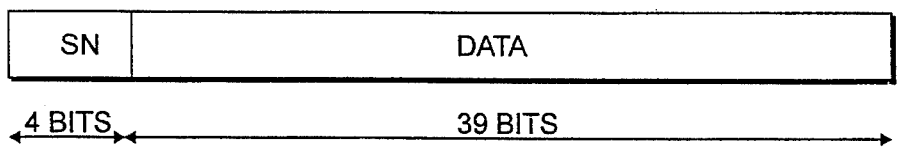
FIGS. 8A, 8B, 8C and 8D illustrate a GSM Channel Request message modified for the packet data transfer according to the invention.
Figure 8B:
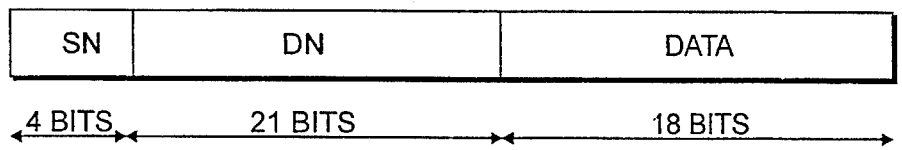
Figure 8C:
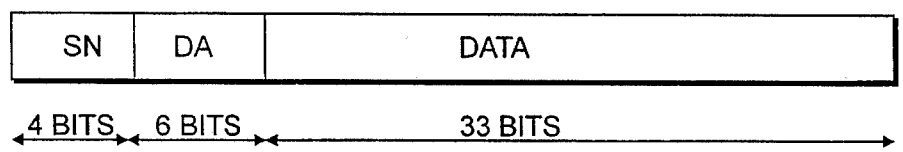

1) The entire destination address complying with the numbering scheme used in the system is transmitted in the first two data packets as shown in FIGS. 8A and 8B. According to the GSM specifications, the address may comprise four bits per digit. As the E.164 identity code is at the most 15 digits, the length of the field DN needed for the destination address in the invention is 60 bits. As the length of the entire data packet is 43 bits and the service number field SN at the beginning of the packet occupies four bits, 39 bits can be transferred in the DN field of the first data packet (FIG. 8A) and the remaining 21 bits in the DN field of the second data packet (FIG. 8B). In addition, it is possible to transfer another 18 bits of user data in the second data packet. The service number included in the data packet identifies the transmitting MS during the data session. Once the destination address has been transferred to the fixed network (e.g. BTS) in the frames shown in FIGS. 8A and 8B, the mobile station MS sends data packets shown in FIG. 8D which contain a 39-bit user data field and a 4-bit service number field SN.

Figure 8D:
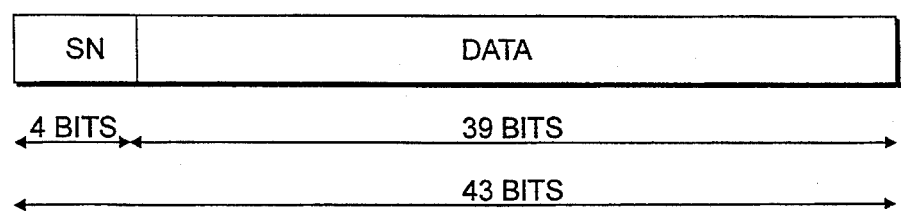

2) Alternatively, the destination address is indicated in the first data packet to be transferred by a short identity DA (e.g. 6 bits) which the fixed network can interpret as the correct destination address. For this purpose, there is preferably a database on the side of the fixed network. The database stores predetermined short identities DA and the respective actual destination addresses DN in tabular form. When this alternative is used, the sending of the destination address to the fixed network uses only 6 bits in the first message. The following data packets are again such as is shown in FIG. 8D, and the fixed network identifies the packet on the basis of the service number and is thus able to translate the service number into the correct destination address.

Further referring to FIG. 5, the fixed network preferably responds to each packet by sending a Packet Data Paging Request message as an acknowledgement message to the mobile station MS on the PCH after each received data packet. The format of the packet acknowledgement message is nearly identical to the message described in connection with FIG. 4. The message type is changed to a value 00100110 and the length of the data area is reduced to 39 bits.

The present inventor's U.S. patent application Ser. No. 08/211,739, filed Apr. 14, 1994, which claims priority from Finnish Patent Application 923669 titled Method for the transfer of user data in packet format in a cellular radio network, filed Aug. 14, 1992, is hereby incorporated by reference for a more detailed description of the configuration of the mobile station and the base station system and the packet transfer therebetween.

The figures and the description related to them are only intended to illustrate the present invention. Details of the method according to the invention may vary within the scope of the attached claims.

I claim:

1. A method for transferring packet data from a transmitting party over a transfer network to a receiving party based on a destination address of the receiving party, comprising:

the transmitting party sending the destination address to the transfer network only once for each transfer transaction, at the beginning of each transfer transaction;

the transfer network allocating to the transmitting party a service number at the beginning of each transfer transaction so as to identify the transmitting party and the destination address, the service number being shorter than the destination address;

the transfer network sending the allocated service number to the transmitting party;

the transmitting party utilizing the allocated service number in place of the destination address in data packets subsequently sent during the transfer transaction; and the transfer network identifying the data packets sent by the transmitting party on the basis of the service number and forwarding the data packets on the basis of the destination address associated with said service number.

2. The method according to claim 1, wherein:

the service number allocated to the transmitting party is valid for a predetermined validity period, upon expiration of which the service number being freed for reallocation.

3. The method according to claim 2, wherein:

the transmitting party monitoring for expiration of said predetermined validity period of the service number;

the transmitting party continuing the transfer of packet data after the expiration of the validity period of the service number by sending a new packet data transfer request to the transfer network; and the transfer network allocating a new service number to the transmitting party if possible, given the traffic load of the transfer network.

4. The method according to claim 1, for transferring user data in packet format in a cellular radio system which has at least one base station in each of a plurality of cells thereof, each base station communicating with a plurality of mobile stations residing in the respective cell and comprising at least one common control channel shared by all of the mobile stations for sending connection establishment requests and response messages thereto from the respective base station to the respective mobile stations and from the respective mobile stations to the respective base station for establishing an actual connection on another channel, the transmitting party is a said mobile station, the transfer network is a fixed network in the cellular radio system, wherein;

user data in packet format is transferred between a respective base station of the fixed network and the respective mobile radio stations in modified connection establishment messages to be sent on said at least one control channel and not causing any actual connection establishment, successful receipts of the connection establishment messages being acknowledged by sending a modified response message on said at least one control channel.

5. The method according to the claim 4, wherein:

said at least one control channel of the respective base station is a plurality of control channels comprising:

a first control channel for sending connection establishment messages from the respective base station to the respective mobile stations;

a second control channel for sending connection establishment messages and acknowledgement messages from the respective mobile stations to the respective base station; and a third control channel for sending acknowledgement messages from the respective base station to the respective mobile radio stations.

6. The method according to claim 5, wherein:

transferring data in package format from a respective mobile station to a respective base station comprises:

sending a packet data transfer request in a modified connection establishment message from a respective mobile station to the respective base station on said second control channel;

allocating a service number identifying the respective mobile station in response to the transfer request;

sending the service number in a modified response message from the respective base station to the respective mobile station on said third control channel;

sending data packets containing user data and said service number in said modified connection establishment messages from the respective mobile station to the respective base station on said second control channel; and identifying data packets received from the respective mobile station and forwarding them on the basis of said service number.

7. The method according to claim 4, wherein:

the cellular radio system is a digital GSM mobile radio system;

said first control channel is a paging channel;

the connection establishment message sent on the first channel is a paging request;

said second control channel is a random access channel and the connection establishment message and the response message sent on the second channel are channel request messages;

said third control channel is an access grant channel; and the response message sent on the third channel is an immediate assignment message.

8. A mobile station for a cellular radio system having at least one base station in each cell thereof, the respective base station communicating with each of a plurality of mobile stations residing in the respective cell, said mobile station comprising:

a radio transceiver for sending user data in packet format to the respective base station;

a controller for controlling said radio transceiver;

first data packet(s) sent by said mobile station to the respective base station at the beginning of each transfer transaction containing an entire destination address of a receiving party while subsequent data packets sent during a same transfer transaction containing a service number in place of said entire destination address, the service number identifying a respective transmitting party and being shorter than said entire destination address.

9. The mobile station according to claim 8, for a cellular radio system having at least one control channel shared by all of said mobile stations in a respective said cell for sending connection establishment requests and response messages thereto from the respective base station to said mobile stations in said cell and from the respective mobile stations to the respective base station so as to establish an actual connection on another channel, wherein: the mobile station sending user data in packet format within modified connection establishment messages which are sent on said at least one control channel but which will not result in actual connection establishment.

10. The mobile station according to claim 9 wherein:
said at least one control channel is a random access channel.

* * * * *

UNITED STATES PATENT AND TRADEMARK OFFICE
CERTIFICATE OF CORRECTION

PATENT NO.  : 5,502,725

DATED       : March 26, 1996

INVENTOR(S) : POHJAKALLIO

It is certified that error appears in the above-identified patent and that said Letters Patent is hereby corrected as shown below:

On the title page:
 item [22] Filed: should read --August 13, 1993--.
add item [86], to include:
--PCT No.: PCT/FI93/00320--;
--§ 371 Date: April 14, 1994--;
--§ 102(e) Date: April 14, 1994--; and add item [87], to include:
--PCT Pub. No.: WO94/05103--;
--PCT Pub. Date: March 3, 1994--.

Signed and Sealed this

Twenty-fifth Day of June, 1996

Attest:

BRUCE LEHMAN

*Attesting Officer*     *Commissioner of Patents and Trademarks*